1,936,017

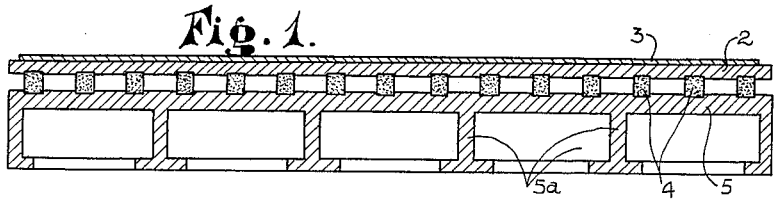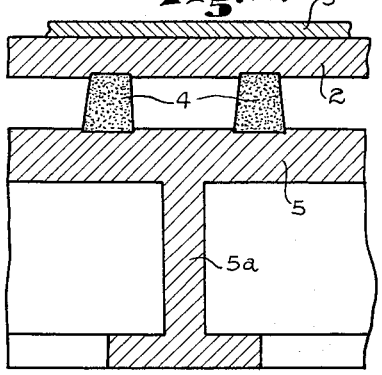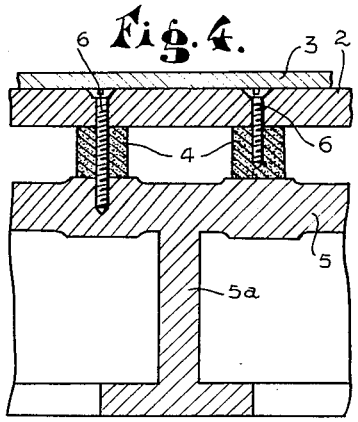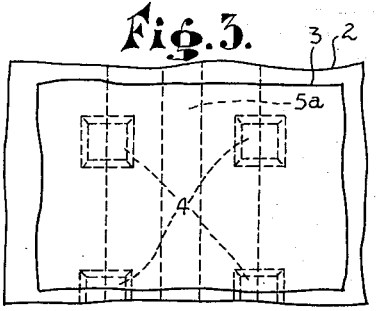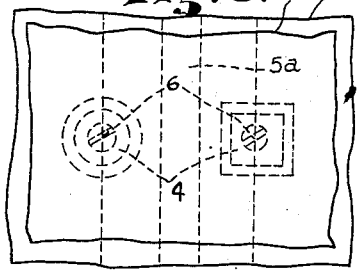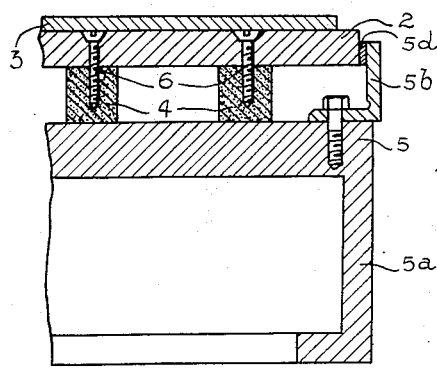
Inventor:
Charles Heuze
By Emah Bonnelycke
Attorney Patented Nov. 21, 1933

UNITED STATES PATENT OFFICE 1,936,017

TABLE FOR SUPPORTING PLATE GLASS AND THE LIKE IN GRINDING AND POLISHING APPARATUS

Charles Heuze, Auvelais, Belgium

Application July 16, 1931, Serial No. 551,259, and in Belgium April 14, 1931

7 Claims. (Cl. 51—240)

In apparatus for grinding, smoothing and polishing plate glass and like materials, the tables supporting the materials to be worked are of considerable thickness. In addition, this thickness is very irregular due to the ribs intended to impart to them great rigidity with a view to maintaining their upper surface perfectly plane.

During the working of the materials, however, the latter become heated by contact with the tools rubbing them, and the heat produced is transmitted to the tables. The resulting cooling of the plate glass does not take place uniformly however, over its entire surface, because of the differences in thickness of the parts of the tables on which the plate glass rests. The plate glass, instead of having a uniform temperature over its entire surface its at a lower temperature above the thinner parts of the tables, due to the more rapid cooling of these parts. This inequality in the distribution of the temperature of the materials worked is prejudicial to securing perfect planeness. Moreover, the heat transmitted to the tables gives rise to expansion in them, the said expansion being much greater in the upper part than in the ribs. These variations in the expansion, due to the variations in thickness of the tables underneath the materials worked, give rise to bulging and deformation of the upper surface of the tables, which necessarily results in variations in thickness in the materials worked. Finally, it is found that, after the cooling of the tables after the polishing operation the said tables remain deformed, which gives rise to considerable inequalities in thickness in the new plate glass which is subsequently worked on the said tables.

With a view to obviating these disadvantages, provision is made according to the invention for the tables to comprise a plate of uniform thickness of a material which is a good conductor of heat, the said plate being supported by a rigid support through the medium of an incompressible thermal insulator. The said plate will preferably be of small thickness so as to diminish the difference in temperature between its two opposite faces.

The cooling of the said plate will advantageously be effected by mounting the latter on the rigid support through the medium of insulating blocks between which air can circulate. Moreover, with a view to not opposing the small expansions of the said plate, it is adapted to move freely relatively to its rigid support, either by a free movement relatively to the insulating material, or by a free movement of the latter relatively to the rigid support.

Other details and features of the invention will be seen in the course of the description of the drawing accompanying this specification and representing diagrammatically and merely by way of example several constructional forms of the invention.

Figure 1 is a vertical section through one constructional form of the invention.

Figure 2 shows on a larger scale a part of Figure 1.

Figure 3 is a view in plan of the part shown in Figure 2.

Figure 4 is a vertical section through a part of another constructional form of table according to the invention.

Figure 5 is a view in plan of the part shown in Figure 4.

Figure 6 is a vertical section through a part of a third constructional form of table according to the invention.

In these different figures, the same reference numerals designate corresponding elements.

A table according to the invention comprises a plate 2 on which the plate glass 3 to be worked is fixed in any known manner, not shown. This plate 2 is made of a material which is a good conductor of heat, steel for example. It is of uniform thickness so as to expand uniformly under the action of the heat generated by the rubbing of the tools, not shown, on the plate glass 3. The said plate 2 which is preferably thin, so as not to have considerable differences in temperature between its two opposite faces, rests on a material which is not a good conductor of heat. This material is preferably in the form of blocks such as 4 disposed at such a distance from each other as to avoid appreciable deformation of the plate 2 under the pressure of the tools.

The material of which the blocks 4 are made, apart from being a thermal insulator should also be incompressible so as not to be deformed appreciably under the pressure of the tools.

The blocks 4 rest on a rigid support 5 which, due to the invention, no longer receives sufficient heat to cause it to expand appreciably and consequently to be deformed. The said rigid support 5 may have ribs such as 5a to increase its rigidity. The use of insulating material in the form of blocks enables air to circulate between the plate 2 and the rigid support 5 and hence to keep the said plate at a low temperature.

As material which is a bad conductor of heat and is incompressible, bakelite or ebonite may be used, for example. The blocks 4 may be sunk slightly into the plate 2 and into the rigid support 5 as shown in Figures 1 and 2. The depth of the recesses is sufficiently shallow, however to permit it to be regarded as not modifying substantially the thickness of the plate 2.

The blocks 4 may be of any longitudinal or cross section. In Figure 3 it will be seen that their cross section is square, while in the left hand part of Figure 5 it will be seen that this section is circular. The cross section may vary from the base to the summit as shown in Figures 2 and 3 or remain constant as in Figures 4 to 6. Instead of sinking the blocks at both their ends, they may be fixed to the plate 2 or to the rigid support 5 by means of screws 6 as shown in the left hand part of Figure 4.

The blocks 4 may also be arranged completely free relatively to the plate 2 or to the rigid support 5, or even completely free relatively to both the plate 2 and the rigid support 5. On the right hand part of Figure 4 and in Figure 6 it will be seen that the blocks 4 are fixed to the plate 2 by screws 6 but are completely free to move relatively to the rigid support 5.

The slight expansion of the plate 2 may thus take place without restraint in all directions. To avoid exaggerated movements of the plate 2 relatively to the rigid support 5, the latter is provided with flanges such as 5b adapted to serve as abutments for the said plate. A layer of material such as rubber may be interposed at 5d to serve as a cushion between the flange 5b and the plate 2.

It is obvious that the invention is not exclusively limited to the constructional forms shown, but that modifications may be made in the form, arrangement and constitution of the elements taking part in its construction without departing from the scope of this invention.

What I claim is:

1. A table for supporting plate glass and like materials in a grinding, smoothing and polishing apparatus, comprising a rigid support, rigid thermal insulators on said support, and a plate of material of uniform thickness which is a good conductor of heat on said insulators and adapted to expand independently of the said rigid support.

2. A table for supporting plate glass and like materials in a grinding, smoothing and polishing apparatus, comprising a rigid support, rigid thermal insulators on said support, and a thin plate of uniform thickness of material which is a good conductor of heat on said insulators and adapted to expand independently of the said rigid support.

3. A table for supporting plate glass and like materials in a grinding, smoothing and polishing apparatus, comprising a rigid support, blocks of rigid thermal insulating material on said support, and a plate of uniform thickness of material which is a good conductor of heat on said blocks of insulating material and adapted to expand independently of the said rigid support.

4. A table for supporting plate glass and like materials in a grinding, smoothing and polishing apparatus, comprising a rigid support, a thin plate of uniform thickness of material which is a good conductor of heat above said rigid support and adapted to expand independently of the latter, and blocks of rigid thermal insulating material disposed between the said support and thin plate at such a distance from each other as to avoid appreciable deformation of said thin plate during the treatment of the glass.

5. A table for supporting plate glass and like materials in a grinding, smoothing and polishing apparatus, comprising a rigid support, rigid thermal insulators on said rigid support and free to move relatively to the latter, and a plate of uniform thickness of material which is a good conductor of heat resting on said insulators and adapted to expand independently of the said rigid support.

6. A table for supporting plate glass and like materials in a grinding, smoothing and polishing apparatus, comprising a rigid support, rigid thermal insulators on said support, a plate of uniform thickness of material which is a good conductor of heat on said insulators and adapted to expand independently of the said rigid support, and flanges on the said rigid support serving as abutments for the plate of uniform thickness.

7. A table for supporting plate glass and like materials in a grinding, smoothing and polishing apparatus, comprising a rigid support, rigid thermal insulators on said support, a plate of uniform thickness of material which is a good conductor of heat on said insulators and adapted to expand independently of the said rigid support, flanges on the said rigid support serving as abutments for the plate of uniform thickness, and a cushion between said flanges and the plate of uniform thickness.

CHARLES HEUZE.